(12) United States Patent
Branciforte et al.

(10) Patent No.: US 7,334,008 B2
(45) Date of Patent: Feb. 19, 2008

(54) QUANTUM GATE FOR CARRYING OUT A GROVER'S QUANTUM ALGORITHM AND A RELATIVE METHOD OF PERFORMING THE INTERFERENCE OPERATION OF A GROVER'S QUANTUM ALGORITHM

(75) Inventors: Marco Branciforte, Catania (IT); Antonio Calabro', Villa San Giovanni (IT); Domenico Porto, Catania (IT)

(73) Assignee: STMicroelectronics S.r.l., Agrate Brinaza (IT)

( * ) Notice: Subject to any disclaimer, the term of this patent is extended or adjusted under 35 U.S.C. 154(b) by 758 days.

(21) Appl. No.: 10/701,160

(22) Filed: Nov. 4, 2003

(65) Prior Publication Data

US 2004/0162640 A1   Aug. 19, 2004

Related U.S. Application Data

(63) Continuation-in-part of application No. 10/701,150, filed on Nov. 4, 2003, which is a continuation-in-part of application No. 10/615,446, filed on Jul. 8, 2003, now Pat. No. 7,203,715.

(30) Foreign Application Priority Data

Jul. 8, 2002   (EP) ................... 02425447
Nov. 4, 2002   (EP) ................... 02425672
Feb. 11, 2003  (EP) ................... 03425080

(51) Int. Cl.
*G06F 7/00*   (2006.01)
(52) U.S. Cl. ...................... 708/200; 359/107
(58) Field of Classification Search ................ 708/200, 708/191; 359/107, 108

See application file for complete search history.

(56) References Cited

U.S. PATENT DOCUMENTS 6,317,766 B1 * 11/2001 Grover ...................... 708/400

(Continued)

FOREIGN PATENT DOCUMENTS

EP   1083520    3/2001
WO   01/67186   9/2001

OTHER PUBLICATIONS

Hioe et al., A Single Flux Quantum Logic Gate with High Functionality, Superconductor Science and Technology, IOP Publishing, Techno House, Bristol, GB, vol. 4, No. 11, Nov. 1, 1991, pp. 658-661, XP000561158.

(Continued)

*Primary Examiner*—Tan V. Mai
(74) *Attorney, Agent, or Firm*—Lisa K. Jorgenson; Allen, Dyer, Doppelt, Milbrath & Gilchrist, P.A.

(57) ABSTRACT

A quantum gate for running a Grover's quantum algorithm using a binary function having a vector basis of n qubits is provided. The quantum gate includes a superposition subsystem, an entanglement subsystem and an interference subsystem. The interference subsystem performs an interference operation on components of entanglement vectors for generating components of output vectors. The interference subsystem performs the interference operation in a very fast manner by using an adder receiving as input signals representing even or odd components of an entanglement vector, and generating a sum signal representing a weighted sum with a scale factor of the even or odd components. The interference subsystem also includes an array of adders each input with a respective signal representative of an even or odd component of an entanglement vector and with the weighted sum signal, and generates a signal representative of an even or odd component of an output vector as a difference between the weighted sum signal and the signal representing an even or odd component of an entanglement vector.

17 Claims, 9 Drawing Sheets

U.S. PATENT DOCUMENTS

7,069,282 B2 * 6/2006 Rizzotto et al. ............ 708/200
2004/0179622 A1 * 9/2004 Calabro et al. ............. 375/242

OTHER PUBLICATIONS

Miquel et al., Factoring in a Dissipative Quantum Computer, Physical Review, A. General Physics, American Institute of Physics, New York, US, vol. 54, No. 4, Oct. 4, 1996, pp. 2605-2613, XP002181469.

Verdal et al., Basic of Quantum Computation, Progress in Quantum Electronics, Pergamon Press, Oxford, GB, vol. 22, Feb. 1998, pp. 1-39, XP000937713.

* cited by examiner

QUANTUM GATE FOR CARRYING OUT A GROVER'S QUANTUM ALGORITHM AND A RELATIVE METHOD OF PERFORMING THE INTERFERENCE OPERATION OF A GROVER'S QUANTUM ALGORITHM

CROSS-REFERENCE TO RELATED APPLICATIONS

The present application is a continuation-in-part of U.S. patent application Ser. No. 10/701,150 filed on Nov. 4, 2003 which in turn is a continuation-in-part of U.S. patent application Ser. No. 10/615,446 filed Jul. 8, 2003, now U.S. Pat. No. 7,203,715 the entire contents of which are incorporated herein by reference.

FIELD OF THE INVENTION

The present invention relates to quantum algorithms, and more precisely, to a quantum gate for carrying out a Grover's quantum algorithm with any number n of qubits and a relative method for carrying out the interference operation of the Grover's quantum algorithm.

BACKGROUND OF THE INVENTION

Quantum algorithms are global random searching algorithms based on the principles, laws and effects of quantum mechanics. They are used for controlling a process or for processing data in a database, and more specifically, for controlling a process that may include search-of-minima intelligent operations.

In the quantum search, each design variable is represented by a finite linear superposition of initial states, with a sequence of elementary unitary steps manipulating the initial quantum state |i⟩ (for the input) such that a measurement of the final state of the system yields the correct output. Usually, three principle operators, i.e., linear superposition (coherent states), entanglement and interference are used in the quantum search algorithm.

A general description of quantum algorithms is contained in U.S. patent application Ser. No. 10/615,446 and in the European patent application no. 02425672.9. Both of these applications are assigned to the current assignee of the present invention.

For a better understanding, a detailed description of the Grover's quantum algorithm is presented below. Grover's problem may be stated as follows:

| Input | A function $f:\{0,1\}^n \rightarrow \{0,1\}$ such that |
|---|---|
| | $\exists x \in \{0,1\}^n$: |
| Problem | $(f(x)=1 \wedge \forall y \in \{0,1\}^n : x \neq y \Rightarrow f(y)=0)$ Find x |

In a Deutsch-Jozsa's algorithm there are two classes of input functions and it must be determined what class the input function belongs to. In this case the problem is in some sense identical in its form, even if it is more difficult because now we are dealing with $2^n$ classes of input functions (each function of the kind described forms a class).

Figure 1:
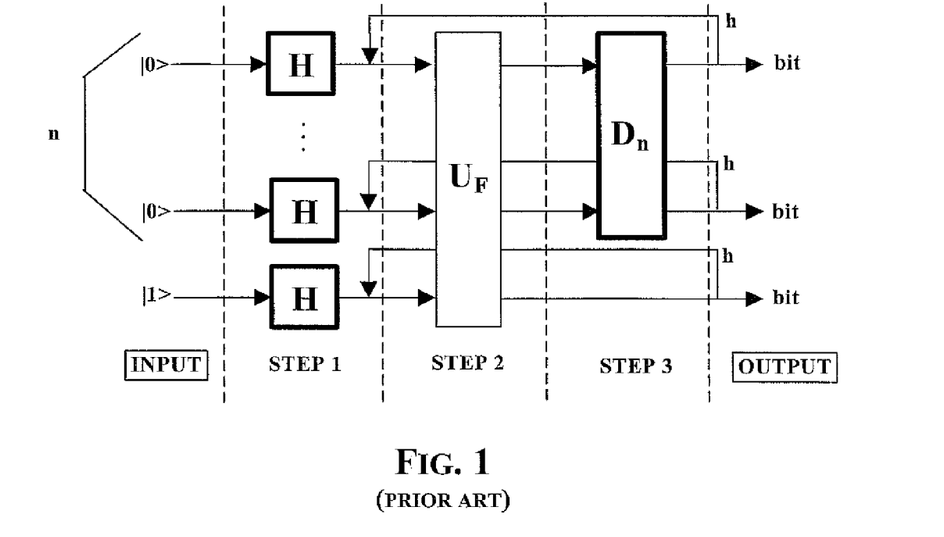
FIG. 1 is an example of a circuit forming a Grover's quantum gate in accordance with the prior art.

The diagram of the Grover's algorithm is depicted in FIG. 1, and the gate equation is $$\Phi = [(D_n \otimes I) \cdot U_F]^{h \cdot (n+1}H) \qquad (1)$$

Operator $D_n$ is called a diffusion matrix of order n and is responsible for interference in this algorithm. The diffusion matrix is defined as follows:

| $D_n$ | $\|0\ldots 0\rangle$ | $\|0\ldots 1\rangle$ | $\ldots \|i\rangle$ | $\ldots \|1\ldots 0\rangle$ | $\|1\ldots 1\rangle$ |
|---|---|---|---|---|---|
| $\|0\ldots 0\rangle$ | $-1 + 1/2^{n-1}$ | $1/2^{n-1}$ | $\ldots 1/2^{n-1}$ | $\ldots 1/2^{n-1}$ | $1/2^{n-1}$ |
| $\|0\ldots 1\rangle$ | $1/2^{n-1}$ | $-1 + 1/2^{n-1}$ | $\ldots 1/2^{n-1}$ | $\ldots 1/2^{n-1}$ | $1/2^{n-1}$ |
| . | . | . | . | . | . |
| . | . | . | . | . | . |
| . | . | . | . | . | . |
| $\|i\rangle$ | $1/2^{n-1}$ | $1/2^{n-1}$ | $\ldots -1 + 1/2^{n-1}$ | $\ldots 1/2^{n-1}$ | $1/2^{n-1}$ |
| . | . | . | . | . | . |
| . | . | . | . | . | . |
| . | . | . | . | . | . |
| $\|1\ldots 0\rangle$ | $1/2^{n-1}$ | $1/2^{n-1}$ | $\ldots 1/2^{n-1}$ | $\ldots -1 + 1/2^{n-1}$ | $1/2^{n-1}$ |
| $\|1\ldots 1\rangle$ | $1/2^{n-1}$ | $1/2^{n-1}$ | $\ldots 1/2^{n-1}$ | $\ldots 1/2^{n-1}$ | $-1 + 1/2^{n-1}$ |

Grover's algorithm may be implemented in routines for searching a desired item in a set, by representing in vector form each item of the set forming an input set of vectors, and applying a Grover's algorithm to this set of vectors. The output vector represents the desired item.

The implementation of the Grover's algorithm clearly implies the calculation of several vector products. In fact, all qubits must be multiplied by the Hadamard matrix H, then by the entanglement matrix $U_F$, and all qubits but the latter must be multiplied by matrix $D_n$.

These multiplications could be carried out via software, but it is quite evident that the number of qubits of a quantum algorithm is very critical in terms of computational speed. In fact, referring to the scheme in FIG. 1, it must be noted that the addition of only one qubit doubles the dimensions of matrices. Thus, the number of elements (and products) increases exponentially.

A method of performing the superposition operation of a Grover's or Deutsch-Jozsa's quantum algorithm over an input set of vectors is disclosed in the European patent application no. 01830383.4, which is assigned to the current assignee of the present invention. This method exploits the fact that any rotated vector obtained performing the Hadamard rotation H (on an input vector) contemplated by the superposition operation of these quantum algorithms can be easily encoded in a binary vector. Therefore, the successive tensor product of the rotated vectors for generating linear superposition vectors can be carried out by logic gates. This fact allows a noticeable time saving because logic gates are very fast.

However, this is not sufficient to significantly speed up running these quantum algorithms because the entanglement matrix $U_F$ is a $2^{n+1} \times 2^{n+1}$ square matrix, which implies a considerable computational weight both in the Grover's algorithm as well as in the Deutsch-Jozsa's algorithm.

Differently from other quantum algorithms, in the Grover's algorithm it is possible to iterate h times the entanglement and interference operations until the best solution is reached. An example of evolution of the Grover's algorithm with n=3 is given in FIG. 2a, in which basis vector (Step 0) and superposition (Step 1), entanglement (Step 2) and interference (Step 3) output vectors are reported in order. Iterating the entanglement and interference operations produces a better distribution of probability amplitudes.

Figure 2A:
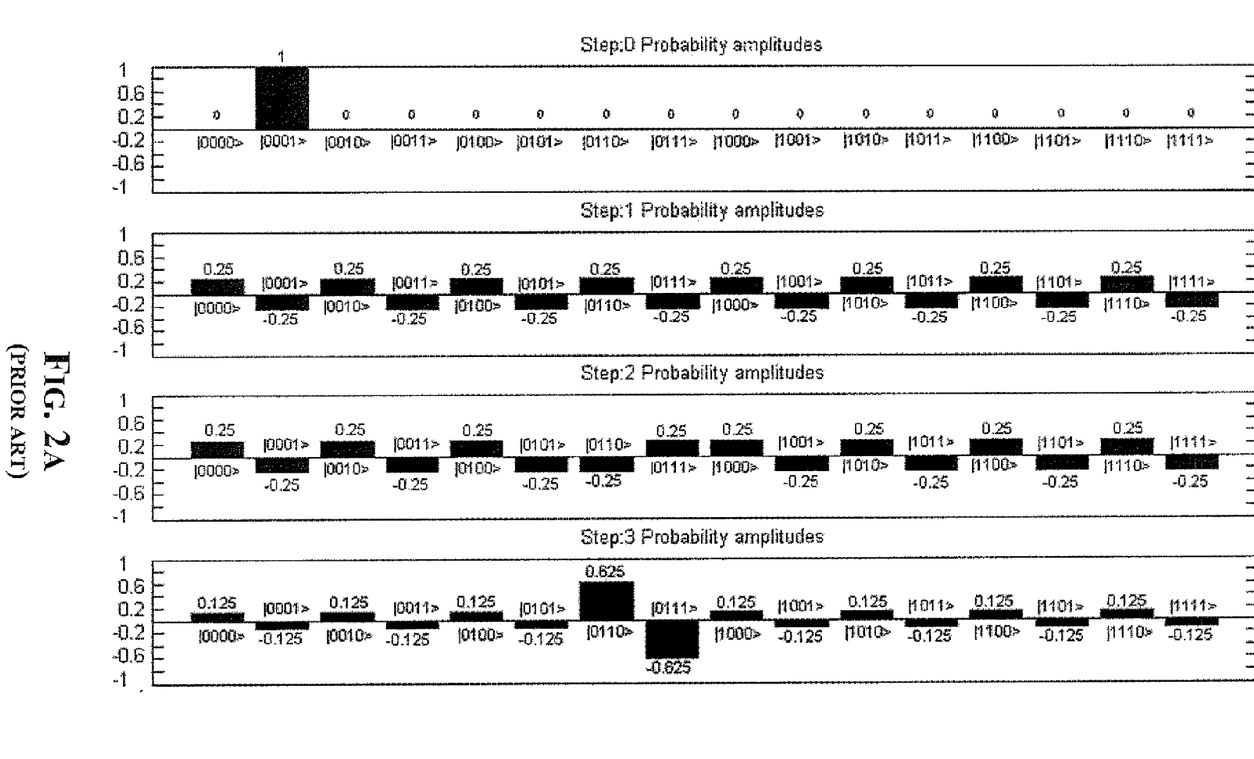
FIGS. 2a and 2b illustrate the evolution of a Grover's quantum algorithm in accordance with the prior art.

Each value is a component on the output vector referred to a basis of vectors of n+1 qubits. There are couples or pairs of values of opposite sign, referred to vectors of the basis having in common the first (leftmost) n qubits. For example, the values 0.625 and −0.625 are referred to vectors |0110⟩ and |0111⟩, respectively. Each pair of elements having an opposite sign represents the probability amplitude of a certain element of the database. For the considered example, the value 0.625 is the probability of the element associated to vector |011⟩ after 3 iterations (h=3).

The algorithm may be iterated as far as a certain quantity is to be minimized, calculated as a function of the components of the output vector, and is smaller than a certain pre-established value. For instance, this quantity can be the Shannon entropy:

$$S(h) = -\sum_{k=1}^{2^{n+1}} \|q_k(h)\|^2 \log \|q_k(h)\|^2 \quad (2)$$

where $q_k(h)$ is the k-th component of the output vector Q taken after h iterations.

Figure 2B:
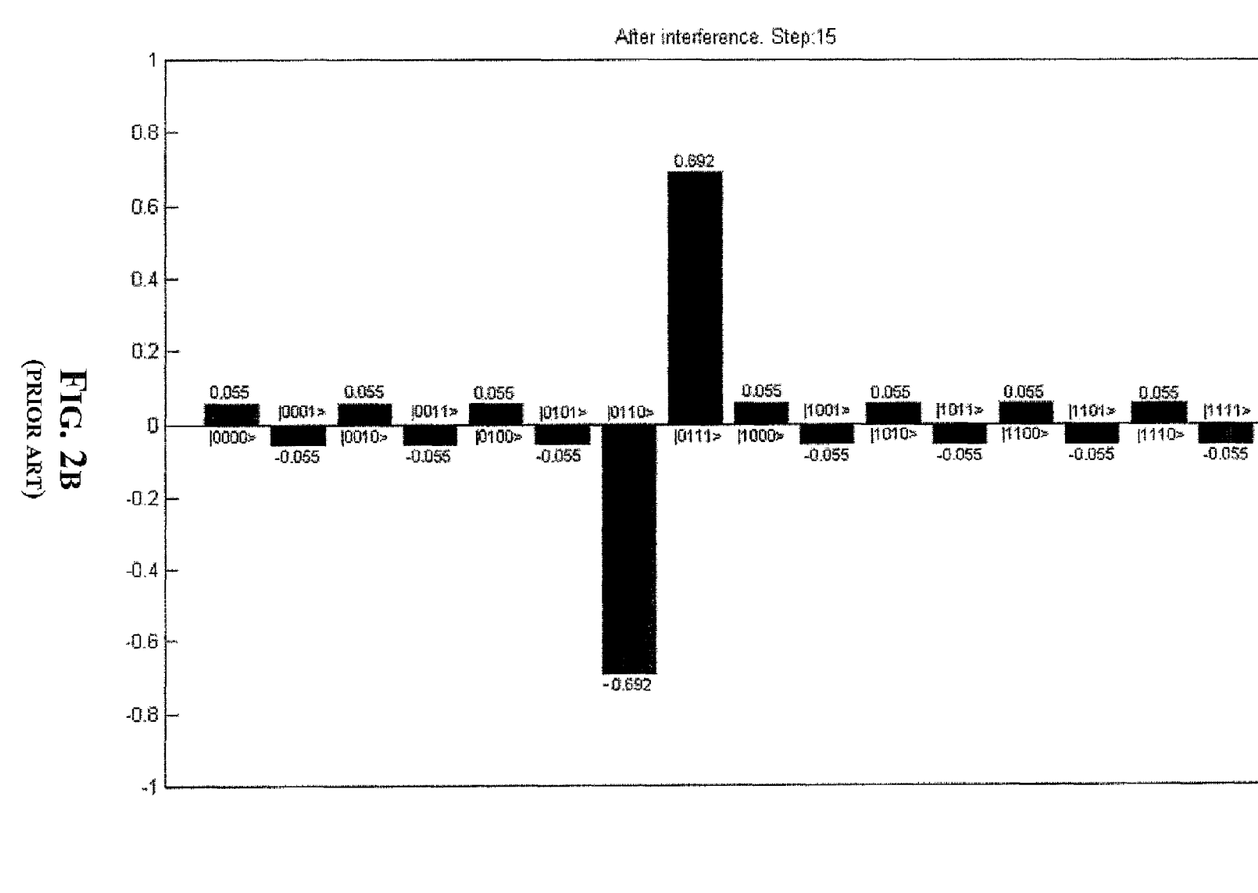

The components of the output vector obtained after h=15 iterations are represented in FIG. 2b. From FIG. 2b it is clear that the element of the database to be found is associated to vector |011⟩, and after 15 iterations the Grover's quantum algorithm will find it with a probability of about 0.69.

From the above discussion it is evident that the large number of computations for the Grover's algorithm represents a considerable burden because multiplications by the entanglement matrix $U_F$ and the interference matrix $D_n \otimes I$ might be repeated many (h) times to produce the best result, and the process may take considerable time.

SUMMARY OF THE INVENTION

In view of the foregoing background, an object of the present invention is to provide a quantum gate and a relative method for executing Grover's quantum algorithms in a very fast manner.

This and other objects, advantages and features in accordance with the present invention are provided by a quantum gate for carrying out a Grover's quantum algorithm using a certain binary function (f) defined on a space having a vector basis of n qubits. The quantum gate may comprise a superposition subsystem for carrying out a superposition operation on components of input vectors for generating components of superposition vectors on a second vector basis of n+1 qubits. An entanglement subsystem may carry out an entanglement operation on components of the linear superposition vectors for generating components of entanglement vectors. An interference subsystem may carry out an interference operation on components of the entanglement vectors for generating components of output vectors.

The quantum gate is capable of performing the interference operation of the Grover's algorithm in a very fast manner by using an adder being input with signals representing even or odd components of an entanglement vector, and generating a sum signal representing a weighted sum with a scale factor of the even or odd components. The quantum gate also uses an array of adders, each being input with a respective signal representative of an even or odd component of an entanglement vector, and with the weighted sum signal, and generating a signal representative of an even or odd component of an output vector as the difference between the weighted sum signal and the signal representing an even or odd component of an entanglement vector.

Another aspect of the present invention is directed to a method for carrying out an interference operation of a Grover's quantum algorithm comprising the steps of calculating a weighted sum with a certain scale factor of even or odd components of an entanglement vector, and generating each even or odd component of an output vector by subtracting from the weighted sum corresponding even or odd components of an entanglement vector.

BRIEF DESCRIPTION OF THE DRAWINGS

The particular aspects and advantages of the present invention will become more evident through the following description of several important embodiments and by referring to the attached drawings, wherein.

DETAILED DESCRIPTION OF THE PREFERRED EMBODIMENTS

A quantum gate for fast running quantum algorithms applied over a set of input vectors is disclosed in the European patent application no. 02425672.9 which is assigned to the current assignee of the present invention. The quantum gate is comprises a superposition subsystem carrying out a linear superposition, an entanglement subsystem carrying out an entanglement operation and an interference subsystem carrying out an interference operation according to the Grover's quantum algorithm.

A hardware quantum gate of the present invention for performing Grover's algorithm with any number of iterations comprises two parts. Part I: (analog) for performing a calculation step-by-step of output values. This first part is divided in the following subsections: I-a: Entanglement; and I-b and I-c: Interference. Part II: (digital) for performing entropy evaluation, storage of vectors for iterations and output display. This part also provides the first basis of vectors.

Figure 3:
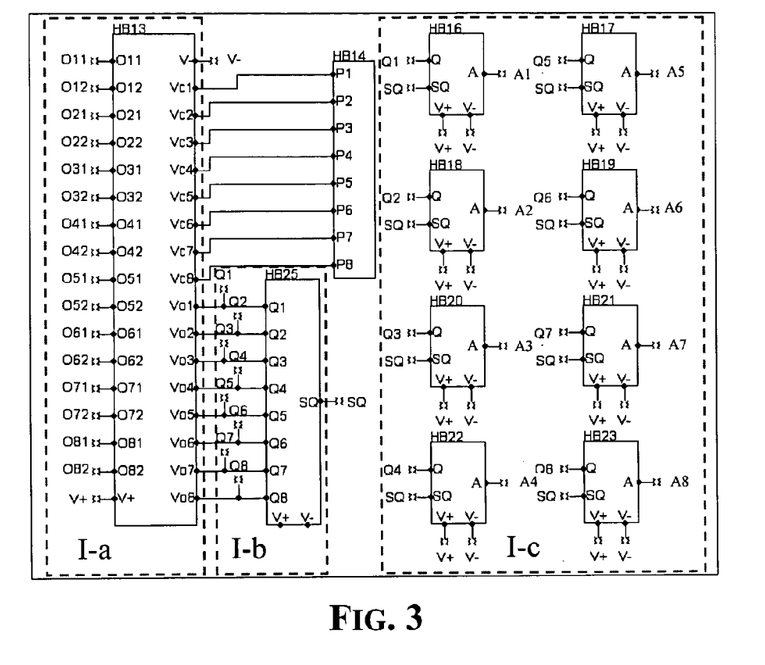
FIG. 3 is a detailed view of entanglement and interference subsystems of the quantum gate in accordance with the present invention.

An analog part for a three-qubits quantum gate is depicted in FIG. 3. A command circuit HB14 generates eight command signals Vc1, ..., Vc8 each representing a value of the function f(.) to be processed on a respective vector of the first basis.

The entanglement subsystem, which preferably may be formed by the command circuit HB14 and by an array of multiplexers I-a, is input with the voltage signals O11, ..., O82 representing the sixteen components of a linear superposition vector, and generates the signals Q1, ..., Q8 representing only the even or the odd components of an entanglement vector.

Let us assume that these signals represent the odd components of an entanglement vector. It is not necessary to calculate all components of the entanglement or output vectors since the odd components of any vector are always opposite to the even components. Therefore, entanglement and interference operations are carried out only on the odd components. The other components are calculated by simply inverting the first ones.

The sections I-b and I-c of a quantum gate shown in FIG. 3 allow the interference operation of the Grover's quantum algorithm to be carried out very quickly. The matrix $D_n \otimes I$ has the following properties. Odd columns (or rows, because $D_n \otimes I$ is symmetric) have non-zero odd components and even columns have non-zero even components. The value of all non-zero components, except for the $i^{th}$ component of $i^{th}$ column (diagonal elements), is $\frac{1}{2}^{n-1}$. The components on the up-left down-right diagonal of the matrix differ form the other non-zero components by being decreased by 1. $G^*$ is an entanglement vector. The output vector of the quantum algorithm $V=(D_n \otimes I)G^*$ involves only a weighted sum of components of $G^*$. The value $\frac{1}{2}^{n-1}$ depends only from the number n of qubits.

From the above analysis, the generic element $v_i$ of V can be written as follows as a function of components $g_i^*$ of the entanglement vector $G^*$:

$$v_i = \begin{cases} \frac{1}{2^{n-1}} \sum_{j=1}^{2^n} g_{2j-1}^* - g_i^* & \text{for } i \text{ odd} \\ \frac{1}{2^{n-1}} \sum_{j=1}^{2^n} g_{2j}^* - g_i^* & \text{for } i \text{ even} \end{cases} \quad (3)$$

Therefore, to calculate a component $v_i$ of the output vector, according to the method of the invention, it is sufficient to calculate a weighted sum of even $$\left( \frac{1}{2^{n-1}} \sum_{j=1}^{2^n} g_{2j}^* \right)$$

or odd $$\left( \frac{1}{2^{n-1}} \sum_{j=1}^{2^n} g_{2j-1}^* \right)$$

components of the entanglement vector and to subtract from the weighted sum the corresponding component $g_i^*$ of the entanglement vector.

Figure 4:
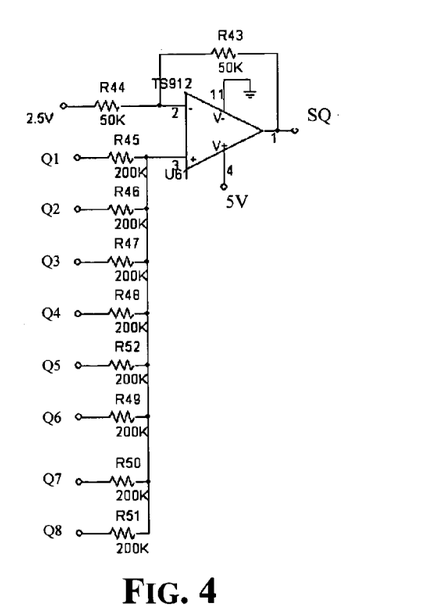
FIG. 4 is an embodiment of the adder HB25 for the even or odd components of an entanglement vector for n=3 of section I-b of FIG. 3.

An adder HB25, which may be as detailed in FIG. 4, sums these components with a certain scale factor that depends only on the number n of qubits (which is 0.25 for n=3), and generates a signal SQ representing the sum of the odd (or even) components of the entanglement vector. The reference voltage of this adder is 2.5V. This makes the voltage signal representing the scaled sum SQ range between [0÷5] Volts, which is the voltage range of the signals in the digital Part II of the quantum gate.

The hardware structure of such a quantum gate must be designed for a pre-established number n of qubits, and is used for handling vectors having a different number of qubits. In fact, the adder of FIG. 4 is specifically designed for a certain number n of qubits (in the considered example n=3).

This lack of flexibility is overcome by forming a quantum gate comprising a plurality of interconnected modules. Each module comprises an adder HB25 having a voltage buffer with an operational amplifier, and the amplifiers of the voltage buffers of all modules are connected in parallel. Basically, each voltage buffer comprises an operational amplifier, a resistor coupling an input of the amplifier to a node at a voltage to be summed and scaled, and a feedback resistor connected between an input and an output of the amplifier.

Figure 5:
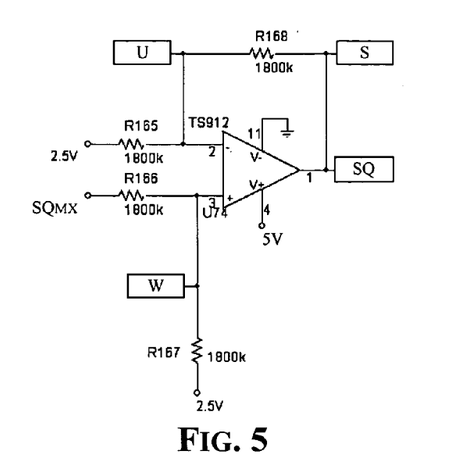
FIG. 5 is a circuit used for forming the adder HB25 of section I-a of FIG. 3 according to a preferred modular embodiment of the quantum gate.

A sample embodiment of such a voltage buffer is shown in FIG. 5. The resistors may have different values from that of FIG. 5, provided that the circuit operates as a stand-alone buffer and forms a part of a modular adder when the terminals of the amplifier are connected with corresponding terminals of other similar buffers.

Preferably, the resistors have a relatively high resistance to prevent the parallel resistors of all the buffers from having an excessively small value such that the operational amplifier will not function correctly. As it will be evident to those skilled in the art, different architectures of the voltage buffer are possible, provided that they have an operational amplifier, a feedback resistor and another resistor for coupling an input of the amplifier to a node at a voltage to be summed.

Preferably, the adder HB25 of each module is composed of an auxiliary adder, as that of FIG. 4, for generating a partial weighted sum $SQ_{MX}$ with a certain scale factor $\frac{1}{2}^{m-1}$ of a certain number of components $2^m$ of even or odd components of an entanglement vector, and a voltage buffer, as that depicted in FIG. 5, being input with the voltage signal representative of the weighted sum $SQ_{MX}$. This configuration is particularly convenient because it allows a weighted sum SQ of $2^{m+k}$ components to be generated by connecting $2^k$ modules in parallel.

Figure 6:
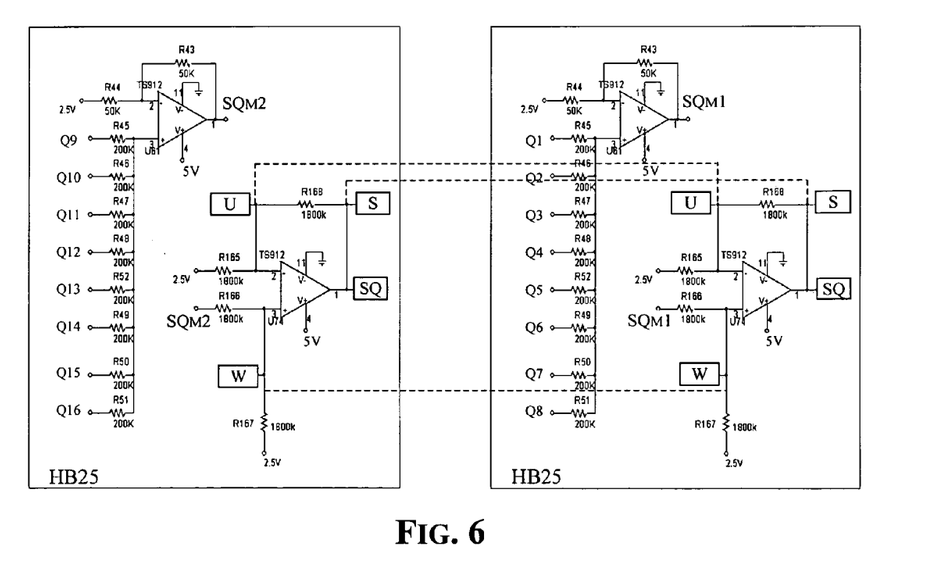
FIG. 6 is a preferred embodiment of the adder HB25 of section I-a of FIG. 3 according to a modular architecture for n=4.
Figure 7:
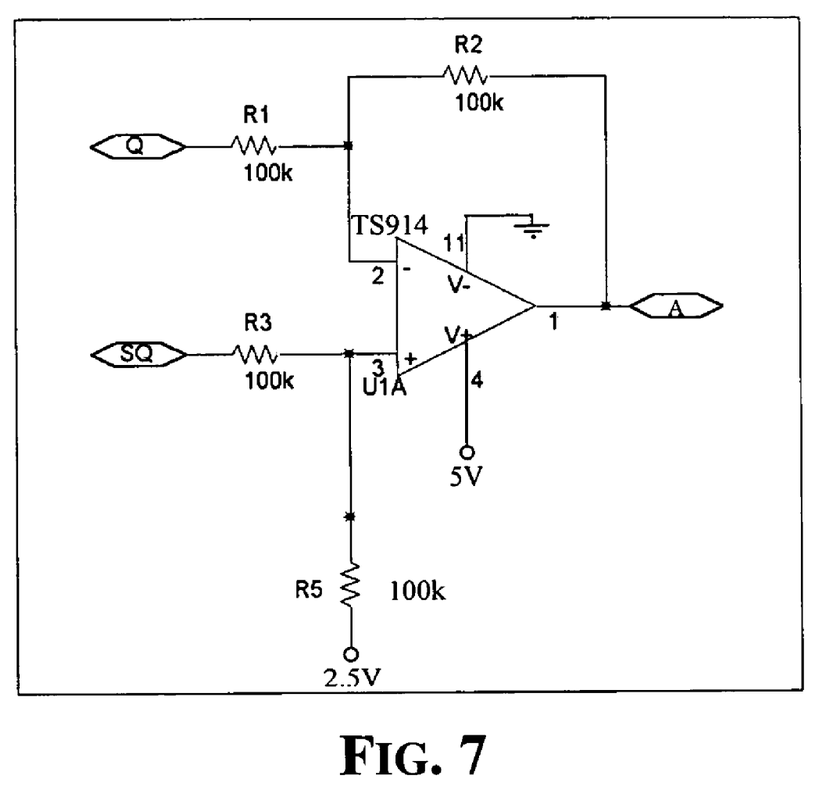
FIG. 7 is a preferred embodiment of a single element of section I-c of FIG. 3.

FIG. 6 shows how two adders HB25 for n=3 qubits may be connected to form a section I-b suitable for the case of n=4 qubits. Finally, an array of adders I-c (see FIG. 3) generates the signals A1, ..., A8 representative of the odd (or even) components of an output vector by subtracting the components Q1, ..., Q8 from the scaled sum SQ. For example, the adders of section I-c may be formed for example as depicted in FIG. 7.

Figure 8:
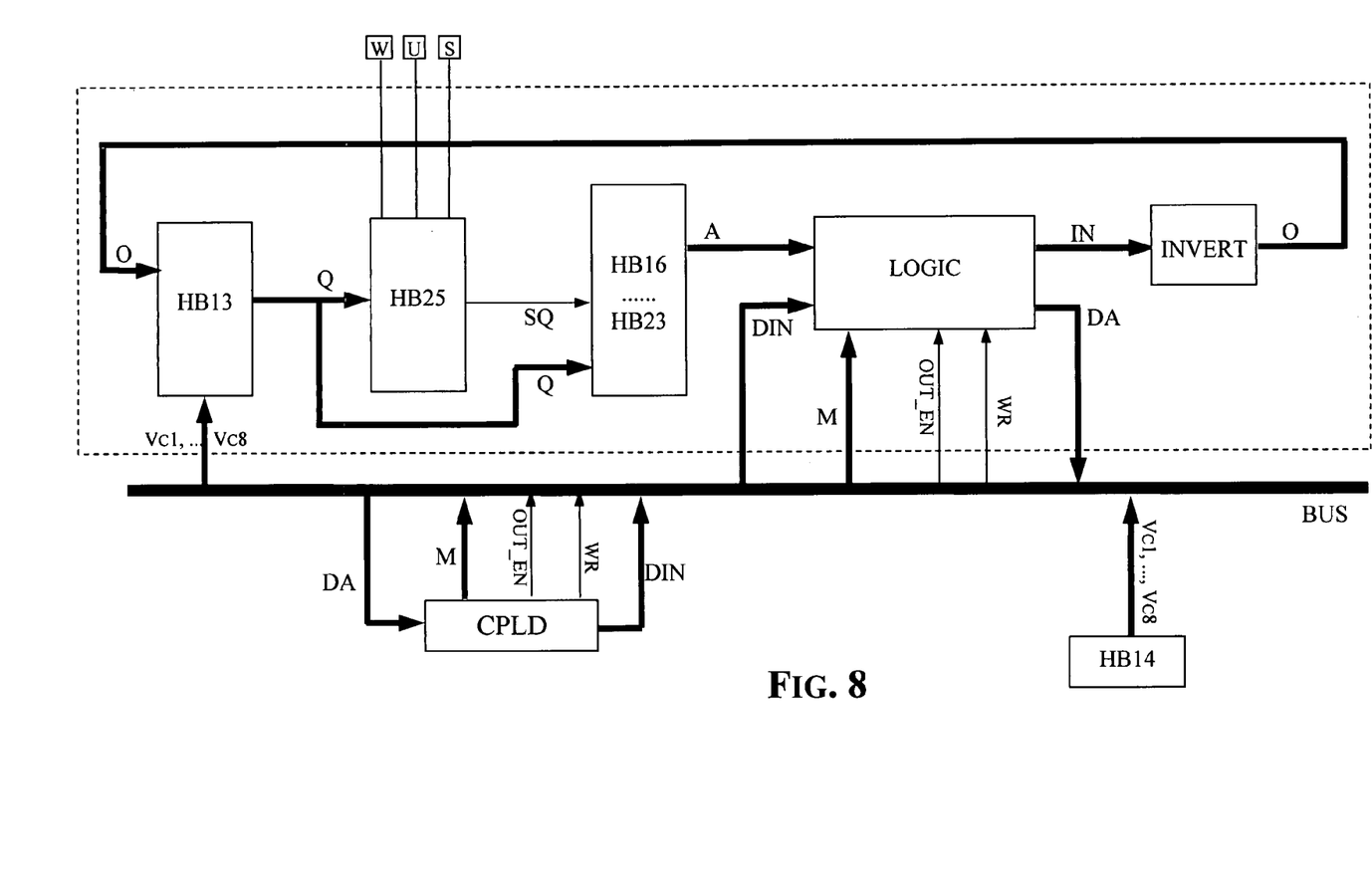
FIG. 8 is a view of a module and the microprocessor unit of the quantum gate in accordance with the present invention.

A basic scheme of a module of a quantum gate in accordance with the present invention is depicted in the dashed rectangle of FIG. 8. Each module substantially comprises an adder HB25 for generating the signal SQ that can be coupled with the adders of the other modules by connecting in common the pins W, U and S. An array of adders HB16, ..., HB23 generates components of an interference vector A. Each module further comprises a digital circuit LOGIC and an inverting circuit INVERT.

Preferably, each module comprises also a subgroup HB13 of the above mentioned array of multiplexers I-a of the entanglement subsystem. The logic command signals Vc1, ..., Vc8 encoding the values of the binary function f(.) to be processed with the Grover's algorithm are sent to each subgroup of multiplexers HB13 of the modules through the internal bus BUS.

The digital circuit LOGIC, belonging to the digital Part II of the quantum gate, generates odd (or even) components of an output vector IN from the respective components of the interference vector A and communicates through the internal bus BUS with a microprocessor unit CPLD.

Figure 9:
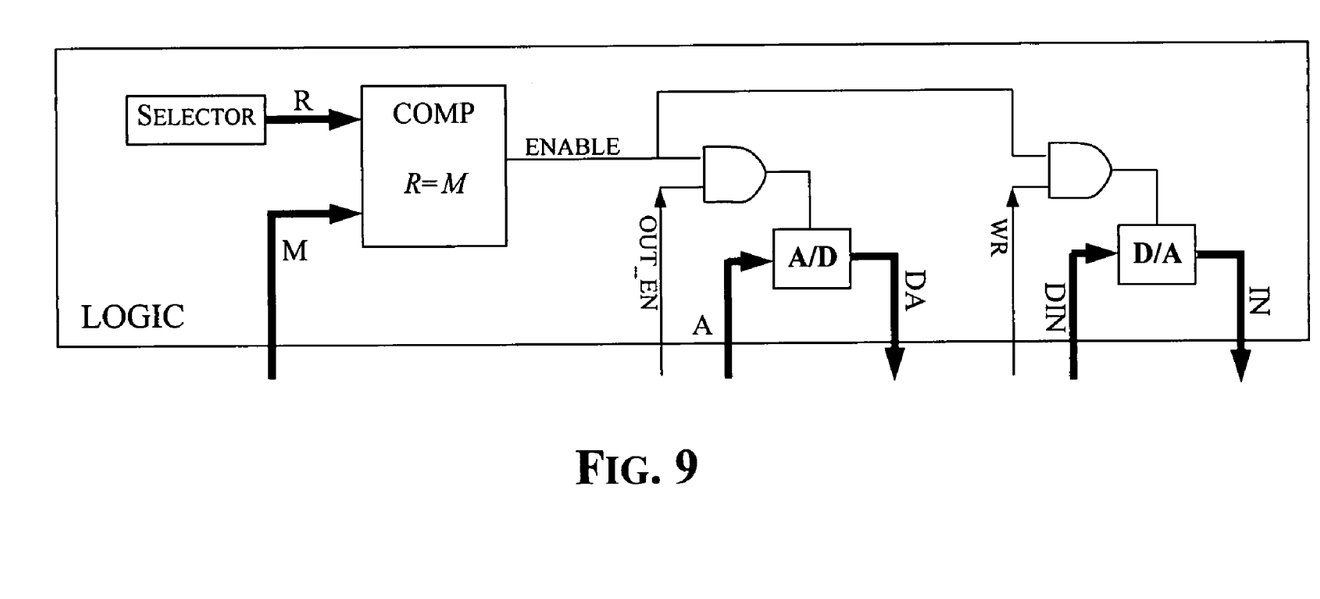
FIG. 9 illustrates the digital circuit LOGIC of FIG. 8.

To better understand the functioning of the digital circuit LOGIC, reference is made to the more detailed diagram of FIG. 9. The circuit LOGIC comprises an identification circuit SELECTOR that generates a relative identification bit string R and a comparator COMP that compares the strings M and R. When the two strings are equal, the comparator switches active the flag ENABLE, indicating that the microprocessor unit CPLD has selected the module for exchanging data with it through the internal bus BUS.

The microprocessor unit CPLD performs different types of operations (storing values, evaluating entropy and stopping iteration) in executing the Grover's algorithm. For evaluating the entropy S of the interference vector A, the microprocessor unit CPLD switches active a first logic signal OUT_EN, thus allowing the A/D converter of the selected module to generate a digital string DA representative of the components of output vector A, calculated by the selected module.

An analog/digital converter, which for example may be the commercial device ADC0808 of National Semiconductor, receives signals representing the components A1, ..., A8 of the output vector A and produces a corresponding binary string DA. The microprocessor unit may be for example the commercial device XC95288XL of Xilinx, and receives this string and calculates the Shannon entropy. If the Shannon entropy is greater than a pre-established value S, the microprocessor CLPD commands a new iteration of the Grover's algorithm by providing a second logic signal WR that makes the D/A converter generate the analog signals IN, representing components of the last calculated interference vector from the digital string DIN output by the microprocessor CPLD.

Figure 10:
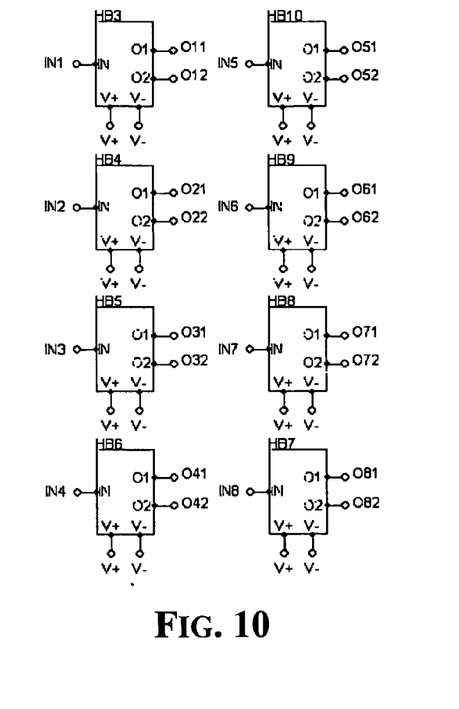
FIG. 10 shows the array architecture of the inverting circuit INVERT of FIG. 8.
Figure 11:
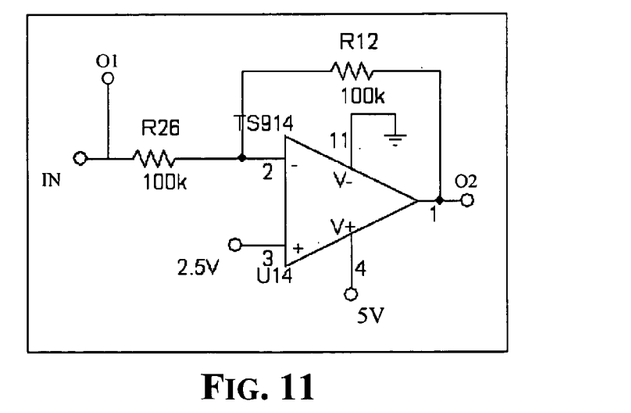
FIG. 11 is a preferred embodiment of the inverters of FIG. 8.

The inverting circuit INVERT of FIG. 8 is depicted in detail in FIG. 10. Substantially, it is composed of an array of inverters HB3, ..., HB10 which may be formed as shown in FIG. 11, that generates all the components O11, ..., O82 of a new superposition vector to be processed from the odd components IN1, ..., IN8.

Basically, the microprocessor unit performs the following functions:
1) drives correctly the converters;
2) acquires digital values and evaluates the Shannon entropy S;
3) compares S with a fixed threshold;
4) if S<threshold, it stops iterations and sends the results to a LED Matrix display, otherwise the results are sent (DIN) to a digital/analog converter; and
5) provides for an initial condition of superposed basis vectors.

A display may also be connected to the CPLD for displaying results. If the Shannon entropy is not sufficiently small, the binary string has to be re-converted in an analog signal by a digital/analog converter to feed it back into the entanglement subsystem I-a. In the embodiment of FIG. 8, the digital/analog converter was the commercial device AD7228 of Analog Devices.

The invention claimed is:

1. A processing device for implementing a quantum gate for running a Grover's quantum algorithm for searching elements in a database using a binary function having a basis of vectors of n qubits, the processing device comprising:
   a superposition subsystem for performing a superposition operation on components of input vectors for generating components of superposition vectors on a second basis of vectors of n+1 qubits;
   an entanglement subsystem for performing an entanglement operation on components of the linear superposition vectors for generating components of entanglement vectors; and
   an interference subsystem for performing an interference operation on components of the entanglement vectors for generating components of output vectors, said interference subsystem comprising
      at least one adder receiving as input signals representative of even or odd components of an entanglement vector, and generating a sum signal representative of a weighted sum with a scale factor of the even or odd components, and
      an array of adders, each receiving as input a respective signal representing an even or odd component of an entanglement vector and the sum signal, and generating as a difference between the sum signal and a signal representing an even or odd component of an entanglement vector a signal representing an even or odd component of the output vector, with the output vector representing the elements searched in the database.

2. A quantum gate according to claim 1, further comprising a processing subsystem comprising:
   at least one analog/digital converter receiving as input the signals representing even or odd components of the output vector for converting the signals into a digital string; and
   a microprocessor unit receiving as input the digital string for calculating a parameter to be made less than a threshold of the digital string of the converted components of the output vector, said microprocessor unit performing the following
      comparing the parameter to be minimized with the threshold for stopping the Grover's algorithm if the parameter is less than the threshold, otherwise commanding another iteration thereof, and
      outputting a digital string with the reduced parameter representing components of the output vector.

3. A quantum gate according to claim 2, wherein said processing subsystem further comprises:
- at least one digital/analog converter receiving as input the digital string with the reduced parameter for generating output signals corresponding to even or odd components of the output vector; and
- an array of inverters, each receiving as input a respective output signal of said at least one digital/analog converter and generating a pair of signals having a predetermined voltage swing representing opposite components of a new superposition vector that is to applied as an input to said entanglement subsystem.

4. A quantum gate according to claim 3, wherein said at least one analog/digital converter comprises commercial device ADC0808; wherein said microprocessor unit comprises commercial device XC95288XL; and wherein said at least one digital/analog converter comprises commercial device AD7228.

5. A quantum gate according to claim 2, wherein the parameter to be minimized comprises a Shannon entropy.

6. A quantum gate according to claim 3, wherein the quantum gate has a modular architecture and further comprises:
- at least one module; and
- an internal bus for exchanging data among said at least one module and said microprocessor unit;
- said microprocessor unit generating addresses of said at least one module to be enabled for sending or for receiving data from said microprocessor unit via said internal bus, and generating first and second logic signals for respectively enabling said at least one analog/digital and said at least one digital/analog converter;
- said at least one module including a respective subgroup of said array of inverters and of said array of adders, and comprising
  - an identification circuit for generating a relative bit string that identifies a selected module, and
  - a comparator receiving as input the bit string of the selected module and the address, and generating a flag that enables the module to exchange data with said microprocessor unit if the received address matches the bit string of the selected module, otherwise the selected module is set in a tristate condition.

7. A quantum gate according to claim 6, wherein said at least one analog/digital converter is enabled by a logic AND between the flag and the first logic signal; wherein said at least one digital/analog converter is enabled by the logic AND between the flag and the second logic signal; and each of said adders comprises a voltage buffer comprising
- an operational amplifier having at least one input for receiving a respective input voltage, and an output for providing the sum signal;
- a feedback resistor connected between an output and the at least one input of said operational amplifier, and
- the corresponding inputs and outputs of said operational amplifiers of said voltage buffers being connected in common.

8. A quantum gate according to claim 7, wherein each voltage buffer comprises:
- a first voltage divider having a first ratio and comprising a first pair of resistors, a first terminal node coupled to a reference voltage and a second terminal node coupled to the input voltage of a respective voltage buffer;
- a second voltage divider having the first ration and comprising a second pair of resistors, a first terminal node coupled to the reference voltage and a second terminal node coupled to the output node of the operational amplifier; and
- the at least one input of said operational amplifier comprising a first input connected to the intermediate node of said first voltage divider and a second input connected to the intermediate node of said second voltage divider.

9. A quantum gate according to claim 8, wherein each of said voltage dividers comprises an identical pair of resistors.

10. A quantum gate according to claim 6, wherein the input voltage of each voltage buffer comprises a voltage representing a respective even or odd component of an entanglement vector.

11. A quantum gate according to claim 6, wherein said adder of each module comprises an auxiliary adder for generating a respective partial sum signal representing a weighted sum of a respective pre-established number of even or odd components of the entanglement vector that is input to the respective voltage buffer.

12. A quantum gate according to claim 6, wherein said entanglement subsystem comprises:
- a command circuit for generating a plurality of logic command signals encoding the values of the binary function corresponding to the first basis of vectors; and
- an array of multiplexers, each driven by a respective logic command signal and receiving as input a plurality of signals representing components of a linear superposition vector corresponding to the second basis of vectors having the first n qubits in common, and outputting for each superposition vector signals representing components of an entanglement vector, each component of the entanglement vector corresponding to a respective vector of the second basis of vectors is equal to the
- corresponding component of the respective superposition vector if the binary function is null in correspondence to the vector of the first basis formed by the first n qubits of the respective vector of the second basis, or
- the opposite of the corresponding component of the respective superposition vector if the binary function is not a null in correspondence to the vector of the first basis formed by the first n qubits of the respective vector of the second basis; and
- each module including a respective subgroup of said array of multiplexers and receiving as input the components generated by the respective subgroup of said array of inverters.

13. A quantum gate according to claim 6, wherein said at least one module comprises a plurality of modules that are identical to each other.

14. A method for operating a processing device comprising a superposition subsystem, an entanglement subsystem and an interference subsystem for running a Grover's quantum algorithm for searching elements in a database using a binary function having a basis of vectors of n qubits, the method comprising:
- performing a superposition operation with the superposition subsystem on components of input vectors for generating components of superposition vectors on a second basis of vectors of n+1 qubits;
- performing an entanglement operation with the entanglement subsystem on components of the linear superposition vectors for generating components of entanglement vectors; and performing an interference operation with the interference subsystem on components of the entanglement vectors for generating components of output vectors, the interference operation comprising providing to at least one adder input signals representative of even or odd components of an entanglement vector, and generating a sum signal representative of a weighted sum with a scale factor of the even or odd components, and providing to an array of adders respective input signals representing an even or odd component of an entanglement vector and the sum signal, and generating as a difference between the sum signal and a signal representing an even or odd component of an entanglement vector a signal representing an even or odd component of the output vector, the output vector corresponding to elements searched in the database.

15. A method according to claim 14, further comprising:

providing to at least one analog/digital converter the signals representing even or odd components of the output vector for converting the signals into a digital string; and providing to a microprocessor unit the digital string for calculating a parameter to be made less than a threshold of the digital string of the converted components of the output vector, the microprocessor unit performing the following comparing the parameter to be minimized with the threshold for stopping the Grover's algorithm if the parameter is less than the threshold, otherwise commanding another iteration thereof, and outputting a digital string with the reduced parameter representing components of the output vector.

16. A method according to claim 15, further comprising:

providing to at least one digital/analog converter the digital string with the reduced parameter for generating output signals corresponding to even or odd components of the output vector; and providing to an array of inverters a respective output signal of the at least one digital/analog converter and generating a pair of signals having a predetermined voltage swing representing opposite components of a new superposition vector that is to applied as an input to an entanglement subsystem performing the entanglement operations.

17. A method according to claim 15, wherein the parameter to be minimized comprises a Shannon entropy.

* * * * *